United States Patent [19]
Willis et al.

[11] Patent Number: 6,127,879
[45] Date of Patent: *Oct. 3, 2000

[54] MULTI-CHANNEL OVERVOLTAGE PROTECTION CIRCUIT

[75] Inventors: Scott C. Willis, Manassas; Mark J. Jones, Centreville, both of Va.

[73] Assignee: Lockheed Martin Corporation, Bethesda, Md.

[*] Notice: This patent issued on a continued prosecution application filed under 37 CFR 1.53(d), and is subject to the twenty year patent term provisions of 35 U.S.C. 154(a)(2).

[21] Appl. No.: 09/030,902

[22] Filed: Feb. 26, 1998

[51] Int. Cl.$^7$ ...................................................... H02H 3/02
[52] U.S. Cl. ........................... 327/408; 327/198; 327/403; 307/86; 307/87
[58] Field of Search .................................... 327/143, 198, 327/403, 404, 407, 408, 415, 416; 361/56, 91; 307/80, 86, 87

[56] References Cited

U.S. PATENT DOCUMENTS

| | | |
|---|---|---|
| 3,573,554 | 4/1971 | Theobald . |
| 4,020,395 | 4/1977 | Erickson et al. . |
| 4,428,020 | 1/1984 | Blanchard . |
| 4,797,608 | 1/1989 | White . |
| 5,070,255 | 12/1991 | Shin ......................................... 327/408 |
| 5,262,680 | 11/1993 | Hu . |
| 5,382,839 | 1/1995 | Shinohara . |
| 5,410,441 | 4/1995 | Allman . |
| 5,587,684 | 12/1996 | Salcedo . |
| 5,610,495 | 3/1997 | Yee et al. ..................................... 320/6 |
| 5,666,082 | 9/1997 | Wilenken et al. ....................... 327/404 |
| 5,783,964 | 7/1998 | Eitan ........................................ 327/408 |
| 5,886,561 | 3/1999 | Eitan et al. .............................. 327/408 |

*Primary Examiner*—Terry D. Cunningham
*Attorney, Agent, or Firm*—Lane, Aitken and McCann

[57] ABSTRACT

A redundant power supply with a number of loads is coupled to each half of the redundant supply by a respectively different MOSFET switch, with logic gates coupling control signals to the MOSFET switches. The control signal is coupled as one input to the logic gate and the output of the logic gate is connected to the MOSFET switch. The other input of the logic gates for a particular power supply is the output of an overvoltage detection circuit whose output is coupled as an input to all the gates for that power supply. The output of the gates opens the MOSFET switches in response to detection of an overvoltage condition.

14 Claims, 3 Drawing Sheets

MULTI-CHANNEL OVERVOLTAGE PROTECTION CIRCUIT

BACKGROUND OF THE INVENTION

1. Field of the Invention

This invention relates to redundant power supply circuits for applications in which each of a number of loads is connected by one or another semiconductor switch to one or the other of two redundant supplies in response to external control signals which operate the switches, and more particularly to an improved circuit which provides protection to the loads from power supply overvoltage in MOSFET switched power supply circuits.

2. Description of the Prior Art

In the prior art, overvoltage protection is often provided by a so-called crowbar circuit, which shunts the supply voltage and protects the load from the overvoltage condition. While generally satisfactory for certain applications, the crowbar circuit dissipates power and can create current stress conditions. Alternatively, some power supplies have internal overvoltage protection. However, to meet isolation requirements, power supplies that provide internal overvoltage protection require a link between the overvoltage event on the secondary side of the supply with the disabling power converter control circuitry on the primary side without ohmic connections between the primary and secondary. This is usually accomplished by one of the following methods. One method adds a slave winding to the isolation transformer to provide a representation of the output voltage. However, this representation of the output voltage is not precise. Another method references all of the control circuits to the secondary side. However, this method requires, within the supply, a dedicated bias supply and a transformer isolated signal to drive MOSFET switches, and thus this method requires appreciable physical volume to implement. Yet another method uses optoisolators, but these can degrade in a space environment. In addition, the optoisolator overvoltage protection circuit must be separate from the main loop reference and error amplifier in order to eliminate the potential for a single point failure that could cause an unrecoverable overvoltage condition.

SUMMARY OF THE INVENTION

An object of this invention is the provision of an overvoltage protection circuit in redundant power supply for use in a space environment with MOSFET semiconductor switches to connect one or another of the redundant supplies to a number of loads.

A further object of the invention is the provision of such an overvoltage protection circuit that does not have a power dissipation and current stress problem. Additional objects include an ability to switch off multiple MOSFETs connected to their respective loads with a minimum number of additional components; a fast response time; independence from the power supply control loop; and logic to override the overvoltage function.

Briefly, this invention contemplates the provision of a redundant power supply with a number of loads coupled to each half of the redundant supply by a respectively different MOSFET switch, with logic gates coupling control signals to the MOSFET switches. The control signal is coupled as one input to the logic gate and the output of the logic gate is connected to the MOSFET switch. The other input of the logic gates for a particular power supply is the output of an overvoltage detection circuit whose output is coupled as an input to all the gates for that power supply. The output of the gates opens the MOSFET switches in response to detection of an overvoltage condition.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT

Figure 1:
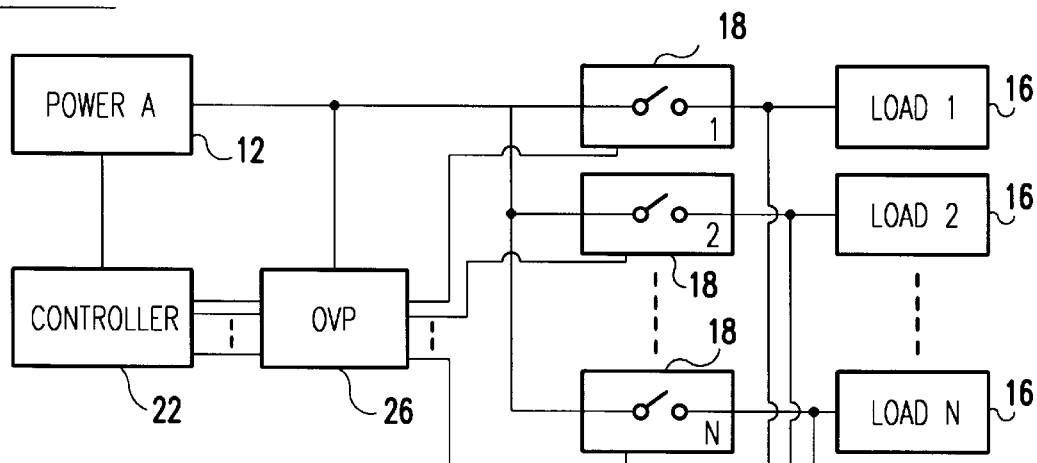
FIG. 1 is a block diagram of one embodiment of a redundant power supply with overvoltage protection in accordance with the teachings of this invention.
Figure 1:
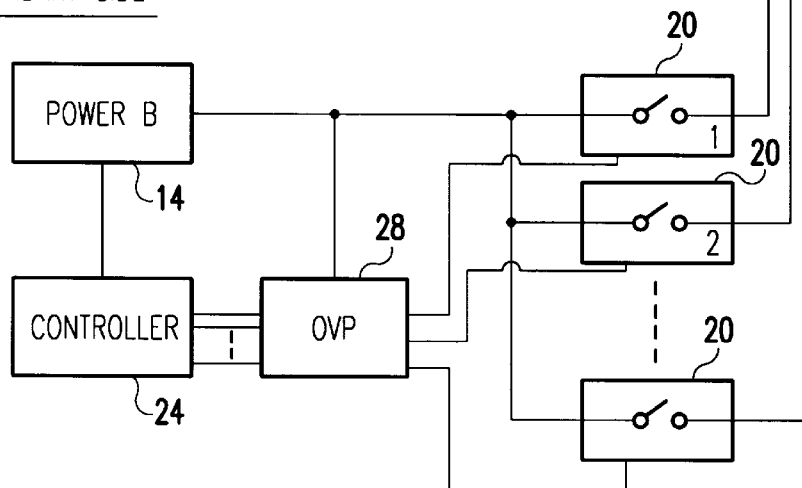

Referring now to FIG. 1, the primary side of the power supply has a power source 12, labeled "POWER A" and the redundant side has a power source 14, labeled "POWER B". Primary power source 12 is coupled to a number of loads 16 labeled LOAD 1 through LOAD N via respective switches 18 labeled 1 through N. Similarly, secondary power source 14 is also coupled to the loads 16 via switches 20 labeled 1 through N. As explained in more detail in copending application Lockheed Scott Willis application, Ser. No. 08/559,584 filed Nov. 16, 1995, which in incorporated herein by reference, output signals from a primary side controller 22 cause switches 18 to open or close and output signals from redundant side controller 24 cause switches 20 to open or close. Interposed between the controller 22 and the switches 18 is an overvoltage protection circuit 26. Similarly, an overvoltage protection circuit 28 is interposed between controller 24 and switches 20.

Figure 2:
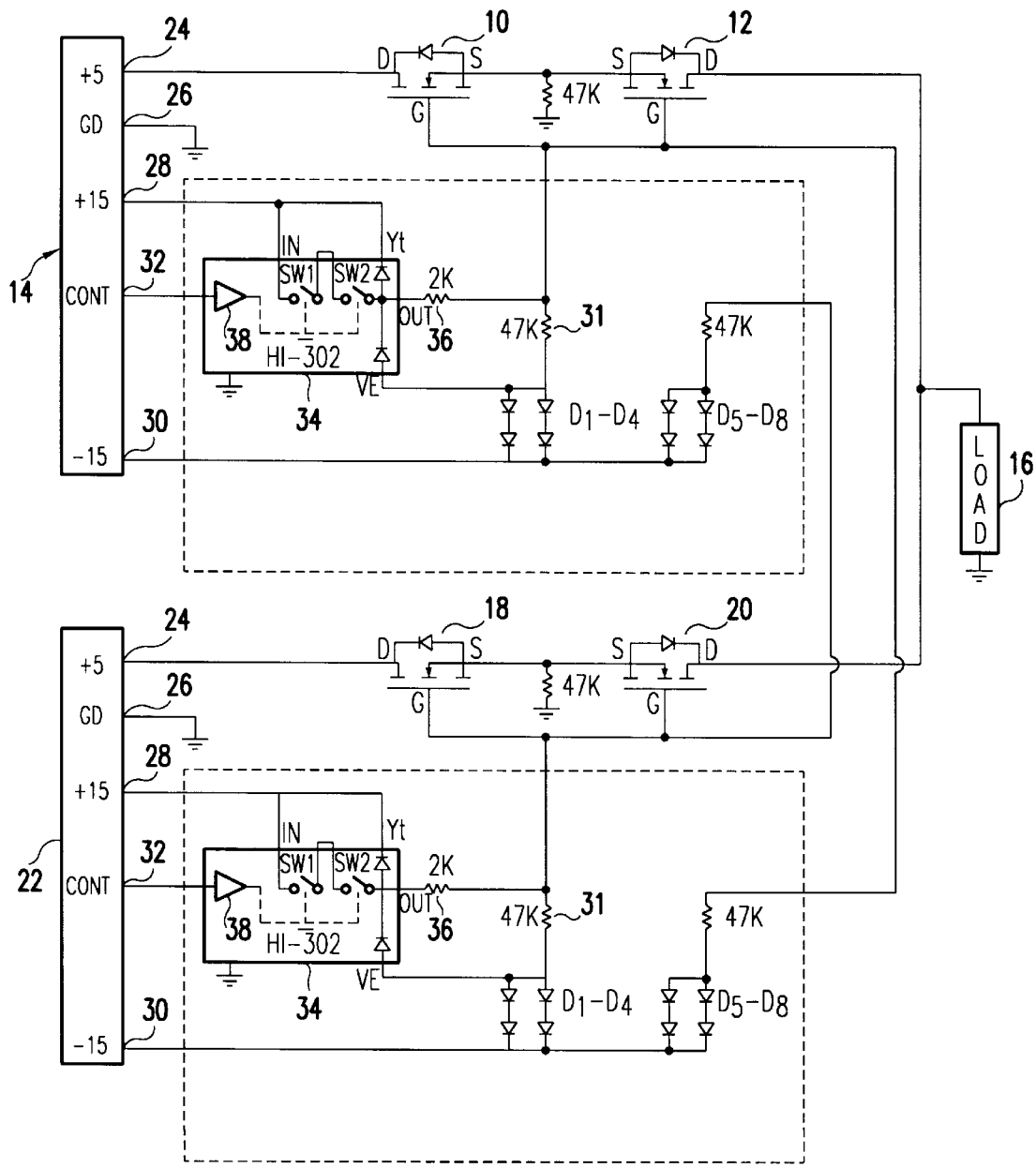
FIG. 2 is a schematic diagram of a preferred MOSFET switch for connecting each load to the redundant power supplies.

FIG. 2 shows details of the switches 18 and 20, which are in the preferred embodiment of the invention back-to-back MOSFET switches which are described in detail in copending application Lockheed Scott Willis application, Ser. No. 08/559,584 filed Nov. 16, 1995, to which reference may be made for a more detailed explanation of their operation.

Figure 3:
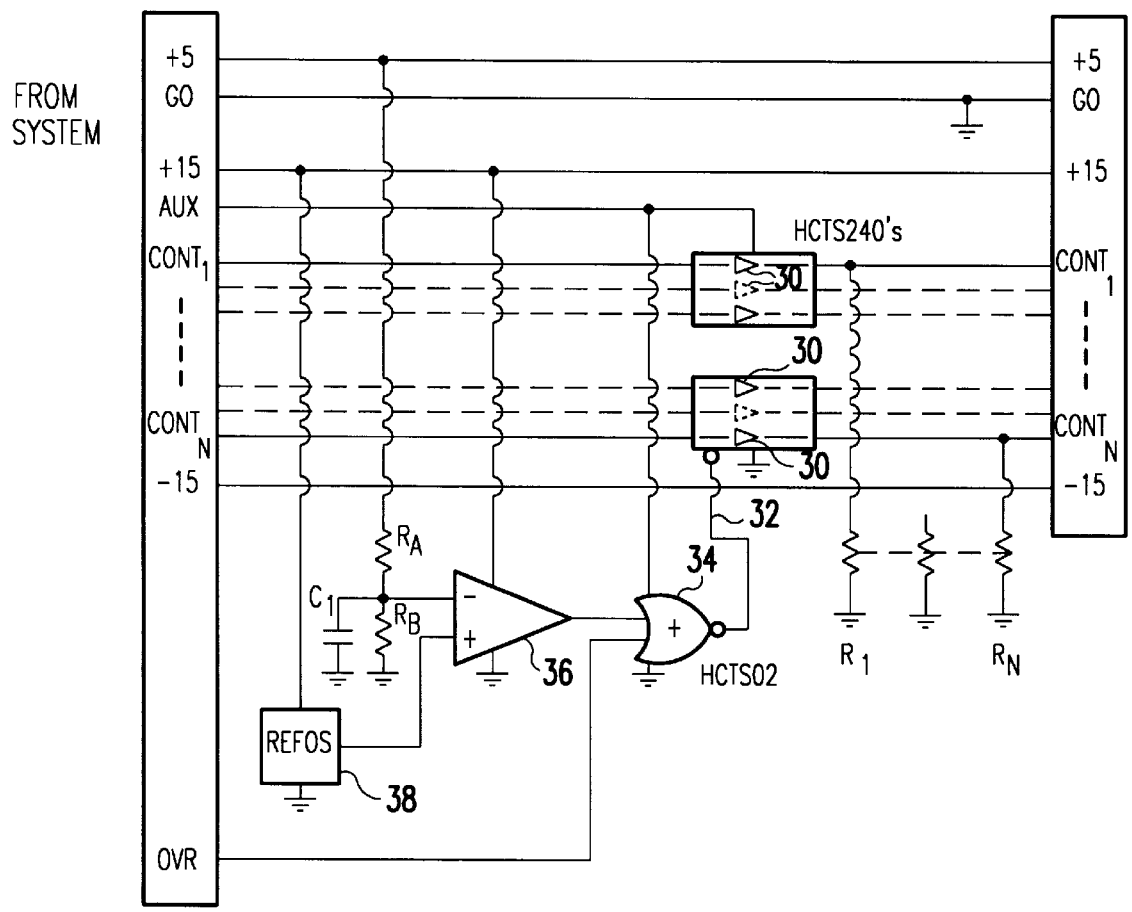
FIG. 3 is a schematic diagram of the overvoltage protection circuit in accordance with the teaching of this invention.

Referring now to FIG. 3, it shows details of the primary side overvoltage protection circuit 26 or 28 in a preferred embodiment of the invention. It will be appreciated that the redundant side overvoltage protection circuit 28 is the same as the primary side circuit 26. Control inputs CONT.1 through CONT.N are connected respectively as one input to NOR gates 30 correspondingly labeled 1 through N. A lead 32 and an OR gate 34 couple the other input to each OR gate 30 to the output of an overvoltage protection circuit which includes a comparator 36, a voltage reference 38, and resistors RA and RB connected as a voltage divider of the load power supply voltage 40. This voltage divider provides one input to the comparator 36, and the reference voltage 38 provides the other input to the comparator 36. The output of the comparator 36 is coupled as one input to the OR gate 34 and the other input to gate 34 is an overvoltage, override signal OVR. When activated, the OVR signal maintains the output of the OR gate 34 in a logically high state irrespective of the output of the comparator 36.

In operation, the output of comparator 36 is logically high as long as the power supply voltage input to the comparator is less than the reference voltage and switches to a logically low output in response to an overvoltage condition. With a logically high input to the NOR gates 30, the impedance of the OR gates will be low if each control signal CONT 1 through CONT.N of the control signal is high and high of the control signal is low. In this way, the control signals CONT 1 through CONT N respectively determines the state of the switches 18-1 through 18-N to which the control signal is connected, in the absence of an overvoltage condition. In response to an overvoltage condition, the output of the comparator is low and in the absence of an OVR signal input to the OR gate 34, the input to each NOR gate 30 is low, placing the OR gates all in a high impedance state, irrespective of the state of the CONT signal. Resistors R1 through RN insure the control signal lines to the switches 18 are held at ground when the NOR gates 30 are in a high impedance state, thus causing any closed switch 18 to open in response to the overvoltage condition.

When asserted, the override signal OVR input to OR gate 34 provides a logically high input to the NOR gates 30 irrespective of the output of the comparator 36, thus preventing the switches from responding to the overvoltage condition.

While the invention has been described in terms of a single preferred embodiment, those skilled in the art will recognize that the invention can be practiced with modification within the spirit and scope of the appended claims.

We claim:

1. A circuit for supplying power to each of a plurality of loads from one or another of two redundant power supplies, comprising in combination:

a first switch for connecting and disconnecting each of said loads to said one of said redundant power supplies in response to a first control signal;

a second switch for connecting and disconnecting said each of said loads to said another of said redundant power supplies in response to a second control signal;

a control signal source for generating said first control signal to control the opening and closing of said first switch and a control signal source for generating said second control signal to control the opening and closing of said second switch;

a plurality of logic gates for connecting respectively said control signal sources to said plurality of switches;

an overvoltage detection circuit for generating a first logic state output in the absence of an overvoltage condition and a second logic state output in the presence of an overvoltage condition;

means to couple the output of said overvoltage detection circuit to one input of said plurality of logic gates, wherein said first and second control signals control the state of said switches when said overvoltage detection circuit output is in said first state and said switches are held in an open state when the input to said logic gates from said overvoltage protection circuit is in said second state.

2. A circuit for supplying power to each of a plurality of loads from one or another of two redundant power supplies, comprising in combination:

first switch means for connecting and disconnecting each of said loads to said one of said redundant power supplies in response to a first control signal;

second switch means for connecting and disconnecting each of said loads to said another of said redundant power supplies in response to a second control signal;

first control signal source means for generating said first control signal to control the opening and closing of said first switch, and second control signal source means for generating said second control signal to control the opening and closing of said second switch;

a logic arrangement for connecting respeceively sad control signal sources to said plurality of switches; and overvoltage detection circuitry for generating a first logic state output in the absence of an overvoltage condition and a second logic state output in the presence of an overvoltage condition, said overvoltage detection circuit for enabling and disabling the logic arrangement.

3. The circuit of claim 2, wherein said first and second switch means each comprise back-to-back MOSFET switches.

4. A circuit for supplying power to a load from one or another of two redundant power supplies, comprising in combination:

first switch means for connecting and disconnecting said load to said one of said redundant power supplies in response to a first control signal;

second switch means for connecting and disconnecting said load to said one of said redundant power supplies in response to a first control signal;

first control signal source means for generating said first control signal to control the opening and closing of said first switch, and second control signal source means for generating said second control signal to control the opening and closing of said second switch;

first and second logic rate gate means for connecting respectively said first and second control signal source means to said first and second switch means;

overvoltage detection circuit means for generating a first logic state output in the absence of an overvoltage condition and a second logic state output in the presence of an overvoltage condition; and means to couple the output of said overvoltage detection circuit means to one input of said logic gate means, wherein said first and second control signals control the state of said first and second switch means when said overvoltage detection circuit means output is in said first state, and said first and second switch means are held in an open state when the input to said logic gate means from said overvoltage protection circuit means is in said second state.

5. The circuit of claim 4, wherein said logic gate means each comprises a plurality of NOR gates, each NOR gate having a first input coupled to the control signal source means and a second input coupled to the overvoltage detection circuit means.

6. A circuit for supplying power to each of a plurality of loads from one or another of two redundant power supplies, comprising in combination:

a first switch circuit connected between said loads and said one of said redundant power supplies, wherein each of said loads is connected to or disconnected from said one of said redundant power supplies in response to a first control signal;

a second switch circuit connected between said loads and said another of said redundant power supplies, wherein each of said loads is connected to or disconnected from said another of said redundant power supplies in response to a second control signal;

a first control signal source, wherein said first control signal is generated to control the opening and closing of said first switch circiut, and a second control signal source, wherein said second control signal is generated to control the opening and closing of said second switch circuit;

a plurality of logic gates connected between said control signal source and said plurality of switches, wherein said control signal source is connected to said plurality of switch circuits;

an overvoltage detection circuit, wherein a first logic state output is generated in the absence of an overvoltage condition and a second logic state output is generated in the presence of an overvoltage condition; and circuitry coupling the output of said overvoltage detection circuit to one input of said plurality of logic gates, wherein said first and second control signals control the state of said switch circuits when said overvoltage detection circuit output is in said first state, and said switch circuits are held in an open state when the input to said logic gates from said overvoltage protection circuit is in said second state.

7. The circuit of claim 6, wherein said switch circuits comprise back-to-back MOSFET switches.

8. The circuit of claim 6, wherein said logic gates each comprise a NOR gate having a first input coupled to the control signal source and a second input coupled to the overvoltage detector circuit.

9. A circuit for supplying power to a load from one or another of two redundant power supplies, comprising in combination:

a first switch connected between said load and said one of said redundant power supplies, wherein said load is connected to and disconnected from said one of said redundant power supplies in response to a first control signal;

a second switch connected between said load and said another of said redundant power supplies, wherein said load is connected to and disconneced from said another of said redundant power supplies in response to a second control signal;

a first control signal source, wherein said first control singal is generated to control the opening and closing of said first switch, and a second control signal source, wherein said second control signal is generated to control the opening and closing of said second switch;

a plurality of logic gates connected bewteen said control signal source and said plurality of switches, wherein said control signal source is connected to said plurality of switches;

an overvoltage detection circuit, wherein a first logic state output is generated in the absence of an overvoltage condition and a second logic state output is generated in the presence of an overvoltage condition; and circuitry coupling the output of said overvoltage detection circuit to one input of said plurality of logic gates, wherein said first and second control signals control the state of said switches when said overvoltage detection circuit outpu is in said first state, and said switches are held in an open state when the input to said logic gates from said overvoltage protection circuit is in said second state.

10. A method for supplying power to each of a plurality of loads from one or another of two redundant power supplies, comprising:

connecting and disconnecting each of said loads to said one of said redundant power supplies in response to a first control signal;

connecting and disconnecting each of said loads to said another of said redundant power supplies in response to a second control signal;

generating said first control signal to control the connecting and disconnecting of each of said loads to said one of said redundant power supplies, and generating said second control signal to control the connecting and disconnecting of each of said loads to said another of said redundant power supplies, wherein, for each of the power supplies, a first logic state output is generated in the absence of an overvoltage condition and a second logic state output is generated in the presence of an overvoltage condition, and, in response to the first logic state output, each of said loads is connected to the redundant power supply for which the logic state output is generated, and in response to the second logic state output, each of said loads is disconnected from the redundant power supply for which the logic state output is generated.

11. The method of claim 10, wherein the step of connecting and disconnecting each of said loads to said one of said redundant power supplies is done by closing and opening a first back-to-back MOSFET switch, and the step of connecting and disconnecting each of said loads to said another of said redundant power supplies is done by closing and opening a second back-to-back MOSFET switch.

12. The method of claim 11, wherein for said one of said redundant power supplies, said first and second control signals are generated by a first plurality of logic gates and, for said another of said redundant power supplies, said first and said second control signals are generated by a second plurality of logic gates.

13. The method of claim 12, wherein the generating of the first and second control signals comprises coupling the logic state output of said one power supply to a first input of a first NOR gate and coupling the logic state output of said another power supply to a first input of a second NOR gate, and wherein said first control signal is transmitted to a second input of the first NOR gate, and said second control signal is transmitted to a second input of the second NOR gate.

14. A method for supplying power to a load from one or another of two redundant power supplies, comprising:

connecting and disconnecting said load to said one of said redundant power supplies in response to a first control signal;

connecting and disconnecting said load to said another of said redundant power supplies in response to a second control signal; and generating said first control signal to control the connecting and disconnecting of said load to said one of said redundant power supplies and generating said second control signal to control the connecting and disconnecting of said load to said another of said redundant power supplies, wherein, for each of the power supplies, a first logic state output is generated in the absence of an overvoltage condition and a second logic state output is generated in the presence of an overvoltage condition, and, in response to the first logic output, said load is connected to the redundant power supply for which the logic state output is generated, and in response to the second logic state output, said load is disconnected from the redundant power supply for which the logic state output is generated, wherein the step of connecting and disconnecting said load to said one of said redundant power supplies is done by closing and opening a first back-to-back MOSFET switch, and the step of connecting and disconnecting said load to said another of said redundant power supplies is done by closing and opening a second back-to-back MOSFET switch;

wherein for said one of said redundant power supplies, said first and second control signals are generated by a first plurality of logic gates and, for said another of said redundant power supplies, said first and said second control signals are generated by a second plurality of logic gates; and wherein the generating of the first and second control signals comprises coupling the logic state output of said one power supply to a first input of a first NOR gate, and coupling the logic state output of said another power supply to a first input of a second NOR gate, and wherein said first control signal is transmitted to a second input of the first NOR gate, and said second control signal is transmitted to a second input of the second NOR gate.

* * * * *